July 9, 1968     H. M. ARCHER     3,392,224
METHOD FOR FORMING PLASTIC RODS AND PROFILES
Original Filed May 24, 1961
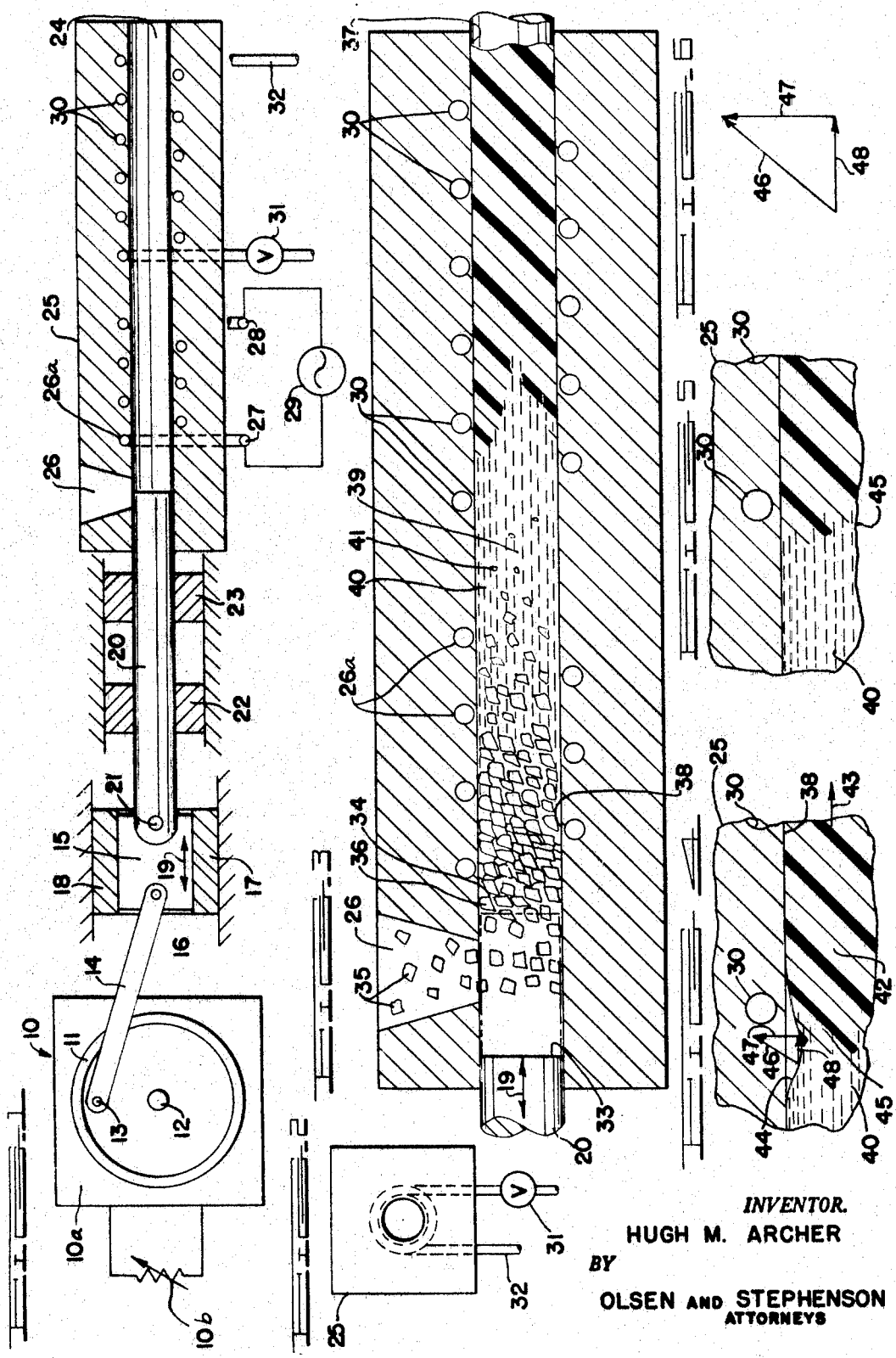
INVENTOR.
HUGH M. ARCHER
BY
OLSEN AND STEPHENSON
ATTORNEYS United States Patent Office 3,392,224
Patented July 9, 1968

3,392,224
METHOD FOR FORMING PLASTIC
RODS AND PROFILES
Hugh M. Archer, Dearborn, Mich., assignor to Phillips Petroleum Company, a corporation of Delaware
Continuation of application Ser. No. 112,423, May 24, 1961. This application Oct. 29, 1964, Ser. No. 407,584
6 Claims. (Cl. 264—176)

This application is a continuation of applicant's copending application Ser. No. 112,423, filed May 24, 1961, now abandoned.

This invention relates to a method for the production of plastic articles having a generally elongated shape and not necessarily having an axis of symmetry in any given direction. The invention further is directed toward the production of plastic articles made of thermoplastic materials although it may be used for the production of elongated articles of other than thermoplastic materials including such materials as elastomeric, metallic, and unrelated materials capable of being made into a semi-fluid or suitably viscous state by the application of heat and pressure.

There are numerous methods of fabricating plastic articles including such common processes as injection molding, extrusion, vacuum forming, transfer molding and casting. Each of these methods is adapted to the production of particular types of parts. By way of an example, it is noted that injection molding processes are used for the production of those plastic articles for which casting in a cavity having the shape of the desired article is customary. In the extrusion process a pump, usually in the form of a screw operating in a closely fitting barrel, pumps the molten thermoplastic material through an orifice which has a shape designed to produce the desired cross-section of extrusion.

The production of articles by the plastic extrusion process is a commercially difficult process for the reason that handling of the hot extrudate as it emerges from the extrusion die is difficult. The material as it emerges from the die is in a thermoplastic state and only with great difficulty can it be held in the desired shape as it cools down in temperature and assumes the condition that it possesses at ordinary temperatures such as room temperature. In addition the flow characteristics of the extrudate as it traverses the orifice are not constant across the several dimensions of the orifice. The flow of the extrudate follows the general laws of the flow of viscous materials in contact with supporting or containing surfaces. As a result, those portions of the flow which are in frictional contact with the walls of the extrusion die suffer a retardation of velocity while those portions which are not so associated with friction portions of the extrusion die flow freely. The result is a non-uniform flow rate across the face of the extrusion orifice with resulting severe distortions of the shape of the extrudate.

The maintenance of the desired extrudate shape has been especially complicated by the development in recent years of thermoplastic extrusion materials possessing a crystalline nature. These materials display violent changes in shape and density as the materials cross an ill defined freezing temperature. Such materials include the high density polyethylenes, the acetal resins, the nylon series and copolymers of these and other resins which have been designed by the resin manufacturers to accomplish certain physical requirements. It is interesting to note that improvement in physical characteristics that have resulted in the greatest advance in the basic engineering involved in the application of plastic materials to domestic and industrial purposes have generally revolved around the concept of the crystallinity of the materials. In this case the term crystallinity denotes the occurrence of physical phenomenon associated with truly crystalline materials. Thus, in traversing the change of phase from the liquid to solid state a molecular orientation occurs, a change in density occurs not linear with temperature, and where non-uniform occurrence of the formation of crystals occurs, violent stresses are set up within the material. These phenomena result in the condition that a fabricator required to produce a part of elongated nature, as for example a square bar or an angle cross-section, or an irregular cross-section shape of the myriad types required by users of plastic materials, is faced with a production problem of practically insurmountable magnitude with equipment available to him at the present. Frequently, the extrusion that he is able to produce is a compromise between the required shape asked for by the ultimate user and techniques that are available to the extrusion operator for the production of the desired shape.

One of the objects of this invention is to permit the production of profiles of thermoplastics and similar materials in which the limitation on the production of the profiles is only the imagination of the designer of the profile and not that of the machinery currently available for the production of such a shape.

A second object of this invention is to provide a technique for making profiles out of any of the crystalline and non-crystalline materials presently available to the art without serious changes in the method of production of said profiles between the several materials.

A third object of this invention is to remove those elements of the extrusion arts which are critical in nature for the production of profiles of plastic materials and to permit the production of plastic profiles in a repetitious and easily controlled fashion.

Still another object of this invention is to produce a method of plastic profile production that requires a minimum of complex machinery and elegant instrumentation for the control of quality of the desired profile.

Another object of this invention is to provide a method for producing plastic articles in which the number of variables that must be adjusted into cooperative magnitude is kept at a minimum, thus enlarging the versatility of the method for producing articles of the said nature.

Other objects of this invention will appear in the following description and appended claims, reference being had to the accompanying drawing forming a part of this specification wherein like reference characters designate corresponding parts in the several views.

Referring to the drawing:

FIGURE 1 is an overall schematic diagram of the various machine elements which are a part of the present invention;

FIGURE 2 is a schematic diagram of a portion of FIGURE 1 as viewed from the right end of FIGURE 1;

FIGURE 3 is an enlargement of a portion of FIGURE 1 illustrating the transformation of granular plastic materials to a finished bar of desired cross-sectional configuration;

FIGURE 4 is an enlarged schematic diagram of a portion of FIGURE 3;

FIGURE 5 is a schematic diagram of the same region as shown in FIGURE 4 but under a different operating circumstance; and FIGURE 6 is an enlargement of the motion vector diagram shown in FIGURE 4.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to FIGURE 1, machine element 10 for imparting mechanical impulse forces as hereinafter described comprises a fly wheel 11 rotatably mounted on shaft 12 and rotated by means of any suitable drive mechanism, such as the variable speed electric motor 10a which has control means 10b for selectively establishing a desired rate of rotation of shaft 12. It is to be understood that any other conventional prime mover may be used as the drive mechanism without departing from the present invention. Attached to fly wheel 11 is a pin 13 to which is connected a connecting rod 14 which in turn is connected to cross head 15 by means of connecting rod bearing 16. Cross head 15 is slidably mounted in bearings 17 and 18 in such a fashion that rotation of the fly wheel 11 about its center 12 causes the cross head 15 to oscillate in the direction shown by arrow 19 at the same periodicity as the fly wheel 11 and in a magnitude controlled by the radial distance between the center 12 of fly wheel 11 and connecting rod pin 13. Cross head 15 is attached to ram or bar 20 by means of pin 21. Rod 20 is slidably mounted in bearings 22 and 23 so that it may reciprocate to the extent dictated by the movement of cross head 15. The bar 20 may have any cross section, but for purposes of clarity of description, in the present instance, a bar of circular cross section has been selected. The bar 20 is closely but slidably fitted to bore or hole 24 of machine element 25. Machine element 25 is usually constructed of a rigid material such as iron. It comprises a bar of substantial cross section having a bore or a hole, such as hole 24, traversing its length which hole may have diverse diameters and cross-sectional shapes. For purposes of clarity in the description of the present invention, a bore or hole 24 of cylindrical nature of constant diameter throughout the entire length of machine element 25 has been selected. At 26 is shown an aperture communicating with the cylindrical hole 24 through which materials may be inserted into the machine element 25 and in particular into its cylindrical hole 24. At 26a is shown an embedded heating system which may be of any convenient construction. In the illustrated embodiment an embedded electrical heater 26a is shown connected by terminals 27 and 28 to a source of electric power schematically denoted at 29 having suitable control means 29a. Axially removed from heating element 26a is cooling means 30, which cooling means may be any convenient construction. For this purpose in the illustrated embodiment of the invention, an embedded tubular passageway is shown through which water may be circulated and which water quantity may be regulated by the control of valve 31. The water may be ejected from the machine element 25 by tube 32 and permitted to drain away.

The method of operation of the present invention will now be explained with attention being directed initially to FIGURE 3 which for reasons of clarity is an enlarged view of the element 25 showing stages of transformation of granular plastic material as it passes from the aperture 26 through the bore 24. As previously stated, the bar 20 reciprocates as is shown by arrow 19, and the extent of motion in each direction is illustrated by the solid line position 33 and the broken line position 34. At 35 are shown plastic granules being permitted to drop into the aperture 26 from external means. When the rod 20 is in the position shown at 33, the unmelted plastic granules 35 will drop into the bore of machine element 25. When the ram 20 has traversed to position 34 under the mechanical impulse of machine element 10 the unmelted granules 35 are forced into a semi-compacted mass generally shown at 36. Repeated oscillations of the bar 20 and the entry of new granules at 34 causes the granules to traverse the bore 24 of machine element 25 and lacking any other influence, they would emerge from machine element 25 at orifice 37. The aforementioned heating means 26a permits the temperature of machine element 25 to be elevated to any desired value. The value which normally has been chosen from experience in operating the present inventon is that which is closely allied with the melting temperature of the thermoplastic material 34. The operating temperatures usually employed have been slightly above the melting temperature of the selected thermoplastic materials. As the unmelted plastic material 35 traverses the region adjacent to the heating means 26a, portions of it are melted on contact with the wall 38 which defines the bore 24 of the machine element 25. Finally in the region generally denoted by 39 a substantially complete melting of the granules of thermoplastic materials has occurred. This condition is denoted by the straight short lines 40 surrounding the unmelted granules 41 positioned in the region just emergent of the heating zone of the machine element 25. Continued mechanical impulse forces delivered by the bar 20 causes the material to move further along the axis of machine element 25 and enter the region of machine element 25 adjacent to the cooling means or channels indicated at 30.

Upon the thermoplastic material entering the region or zone which is generally in heat transfer relationship with cooling channels 30, the excess heat above that which is necessary to melt the thermoplastic material is removed and the material freezes as it traverses the aforesaid cooling region. The repeated mechanical impulse forces of ram 20 cause the material to traverse the cooling zone and emerge at 37. By adjusting the rate at which the impulses are delivered to the material and the quantity of material 35 caused to enter at the aperture 26, a total freezing of the material prior to emerging from the machine element 25 occurs and a solid bar of the thermoplastic material emerges at 37 in a frozen state at a temperature which permits the easy handling of the extrudate.

Although the invention thus far has been described using a machine element having a cylindrical bore, those conversant with the construction of similar machine elements are readily aware that the cross sectional shape of the bore of machine element 25 may assume any desired shape as, for example, a square or an angle or any other arbitrary profile desired by the designer of such profiles.

Attention is now directed to FIGURES 4, 5 and 6 for further explanations in connection with the method of operation and functioning of the present invention. As previously explained, the cooling channels 30 serve to keep the region about them cool and to extract heat from the hot thermoplastic material traversing the bore 38. The short straight lines 40 denote molten thermoplastic material and the conventionally shaded plastic material shown by way of an example at 42 denotes frozen thermoplastic material being caused to traverse the barrel 24 under the impulse forces of bar 20. The direction of motion of the thermoplastic material, illustrated in FIGURE 4, is shown by arrow 43. The boundary of the thermoplastic material traversing the bore of machine element 25 is shown in exaggerated form by the line 44. It has been observed during the conducting of experiments that the material shrinks as it crosses the phase line from molten to solid and in so doing it withdraws from the internal surface of the bore of machine element 25 a microscopic amount. The repeated mechanical impulse forces of bar 20 however cause the material to reexpand in a periodic fashion and contact the wall of machine element 25 in the cooling region kept cool by cooling elements 30, as shown in FIGURE 5. The repeated impulses not only serve to keep the material in close contact with the wall of bore 38 in the region of the cooling elements of machine element 25, but also cause it to assume very closely the complementary shape of the bore 24. Thus, although there are times, during certain portions of the impulse cycle delivered to the material by bar 20, when the material is not in contact with the wall of the machine element 25 as shown in FIGURE 4, it exudes from the machine element as though it were in constant contact with the wall of machine 25 as shown in FIGURE 5.

It has been discovered, however, that it is essential to the operation of the present invention that the pressure causing the material to move along the bore of machine element 25 be repeatedly released. It has been observed that the forward progress of the material through the bore of machine element 25 is seriously impeded and at times made impossible unless the material is permitted to recede from the wall of machine element 25. Although it is not certain what the exact mechanism of the resultant phenomena is, observations make it appear that the pressure waves traversing the region of the thermoplastic material adjacent to the area shown at 45 causes the semi-molten material to expand not only outward but slightly forward as shown in the direction of arrow 46. It will be noted that arrow 46 has not only a radial component outward as shown at 47 but also an axial component 48. The triangle comprising motion vectors 46, 47 and 48 is shown enlarged in FIGURE 6 in an effort to make more apparent that the material traversing the cooling zone possesses a component of motion toward the exit end of the machine element 25. Repeated impulses delivered by bar 20 thus cause the material although increasingly solid and frozen to traverse the machine element 25 and emerge at 37 possessing the shape, and with very close dimensional tolerances, of the bore 24.

Substantiation of the theory of operation of the present invention has been experienced by purposely misadjusting the cooling rate at 30 so that the temperature of the material as it emerges at 37 is so low as to permit no distortion of the material under the impact of the impulses delivered by bar 20. Under this circumstance the material will not emerge from the machine element 25 and repeated operation of the bar 20 and insertion of unmelted granules 34 in the aperture 26 causes the destruction of the machine element 25 by either explosion or breakage of the machine element 10 or bar 20. Calculations of the magnitude of the pressures delivered by the impulse bar 20 as produced by experimental apparatus has suggested that at such times the pressures within the machine element 25 rose to magnitudes of the order of one hundred thousand pounds per square inch. It was thus apparent during early experiments that a unique enabling phenomenon was taking place within the machine element 25 caused by the careful manipulation of the temperatures of the heating zone at 26 and the cooling zone at 30 and the frequency with which the impulse pressure wave was delivered to the material. These several items appear to be dependent functions which when carefully adjusted in relation with each other will produce a steady succession of minute forward movements of the thermoplastic material with each impulse pressure wave delivered to it by the bar 20.

In operation, it has been discovered that various materials may be extruded by means of the disclosed device with an ease and control not heretofore enjoyed by the extrusion industry using any of the currently available apparatus. It has been found necessary only to adjust for each material the temperature of the heating zone and the rate of feed of the unmelted material into the machine element 25, and this has then resulted in the production of a dense, dimensionally stable, and easily handled extrudate with an ease heretofore unavailable by any known means. In addition, the application of the theory that has been derived of the operation of the machine element 25 in the making of different profiles, uniformly has permitted the production of the profiles in a precalculable fashion.

In addition, the ease with which the temperatures could be manipulated to accommodate any material, permitted the easy application of the machine element 25 to the extrusion of any material including materials not now extrudable with apparatus for the intended purpose. In the latter class are certain high molecular weight polyethylene thermoplastics whose viscosity when molten is so high as to make them inoperable in either injection or extrusion apparatus currently available.

Preparation of the machine element 25 requires only a moderate skill in the mechanical arts. Although the surface of bore 24 is preferably very smooth, it has been found that the device will operate over a wide range of surface finishes and characters with no serious change in the operating characteristics of the device.

I claim:

1. A method of producing a continuous rod of preselected profile from granular material capable of being made into a liquid state by the application of heat and pressure and having the property of shrinking when changing from a liquid state to a frozen state, comprising the steps of continuously compacting such granular material in the form of said profile by the application of mechanical impulse forces, heating said continuously compacted material until the same is substantially melted, cooling the substantially melted material in confines which define the form of said profile until the same is frozen, and continuing the application of said mechanical impulse forces during the freezing step so that when the material normally shrinks it is caused to reexpand in a periodic fashion to the shape of said profile.

2. In a method of producing a continuous rod of preselected profile from material having the property of shrinking when changing from a melted state to a frozen state and which in one of its stages of transformation is translated in a substantially melted state into a cooling zone in a passageway of the desired profile, the steps of cooling the material in said cooling zone to freeze the material, and simultaneously applying mechanical impulse forces to the material to advance the material in increments of movement through the cooling zone and so that during the freezing step when the material normally shrinks it is caused to reexpand in periodic fashion to conform to the shape of said passageway, said mechanical impulses forces effecting repeated application and release of the pressure which causes the movement of the material through said passageway.

3. A method of producing a continuous elongated article of preselected cross sectional configuration from granular thermoplastic material capable of being made into a melted state by the application of heat and pressure and having the property of shrinking when changing from a melted state to a frozen state, comprising the steps of continuously feeding granules of said thermoplastic material into an elongated passageway, continuously compacting such granular material in said passageway by the application of mechanical impulse forces to advance said material through said passageway, and, while said material is being advanced in said passageway, heating said continuously compacted material until the same is melted, confining such melted material in the form of said configuration, cooling the melted material while confined in said configuration until the same is frozen, and continuing the application of said mechanical impulse forces during the freezing step so that said material when discharged conforms to said configuration.

4. In a method of producing a continuous elongated article of preselected cross sectional configuration from thermoplastic material having the property of shrinking when changing from a melted state to a frozen state and which in one of its stages of transformation is translated in a substantially melted state into a cooling zone in a passageway of the desired profile, the steps of cooling the material in said cooling zone to freeze the material, and simultaneously applying mechanical impulse forces to the material to advance the material in increments of movement through the cooling zone so that during the freezing step the material normally is caused to conform to the shape of said passageway, said mechanical impulse forces effecting repeated application and release of the pressure which causes the movement of the material through said passageway.

5. A method of producing a continuous rod of preselected profile from granular thermoplastic material capable or being made into a liquid state by the application of heat and pressure and having the property of shrinking when changing from a liquid to a solid state, comprising the steps of supplying such granular thermoplastic material continuously to a passageway having a longitudinal axis and a discharge end portion defining said profile, applying axially of the passageway mechanical impulse forces to the granular thermoplastic material so as to compact and to translate such compacted material intermittently under pressure toward said discharge end, and as the material is being translated through said passageway by said impulse forces passing it initially through a heating zone and heating it until it is substantially melted and thereafter passing it through a cooling zone until the material is frozen, said mechanical impulse forces being applied continuously during this translation so that during the freezing step when the material normally shrinks it is caused to reexpand in a periodic fashion and to contact the wall of the passageway to form a rod conforming to the confines of the passageway rather than a rod which has shrunk to a different dimension, and discharging the formed rod from the discharge end of said passageway.

6. A method of producing a continuous elongated article of preselected cross sectional configuration from granular thermoplastic material capable of being made into a melted state by the application of heat and pressure and having the property of shrinking when changing from a melted to a solid state, comprising the steps of supplying such granular thermoplastic material continuously to a passageway having a longitudinal axis and a discharge end portion defining said profile, applying axially of the passageway mechanical impulse forces to the granular thermoplastic material so as to compact and to translate such compacted material intermittently under pressure toward said discharge end portion as the material is being translated through said passageway by said impulse forces passing it initially through a heating zone and heating it until it is substantially melted thereby confining such melted material in the form of said cross sectional configuration in said discharge end portion, and thereafter passing said material through a cooling zone while maintaining said material in said cross sectional configuration until the material is frozen, said mechanical impulse forces being applied continuously during this translation to form an elongated article conforming to the confines of the passageway rather than an elongated article which has shrunk to a different dimension, and discharging the formed elongated article from the discharge end portion of said passageway.

References Cited

UNITED STATES PATENTS

| 3,239,881 | 3/1966 | Larsen | 264—120 |
| 2,372,773 | 4/1946 | Fiechter | 264—120 |

ROBERT E. WHITE, *Primary Examiner.*

R. B. MOFFITT, A. R. NOE, *Assistant Examiners.*